(12) United States Patent
Li et al.

(10) Patent No.: US 11,741,726 B2
(45) Date of Patent: Aug. 29, 2023

(54) LANE LINE DETECTION METHOD, ELECTRONIC DEVICE, AND COMPUTER STORAGE MEDIUM

(71) Applicant: Beijing Baidu Netcom Science Technology Co., Ltd., Beijing (CN)

(72) Inventors: Yingying Li, Beijing (CN); Xiao Tan, Beijing (CN); Hao Sun, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 74 days.

(21) Appl. No.: 17/494,682

(22) Filed: Oct. 5, 2021

(65) Prior Publication Data

US 2022/0027639 A1 Jan. 27, 2022

(30) Foreign Application Priority Data

Jan. 25, 2021 (CN) .......................... 202110097191.8

(51) Int. Cl.
*G06V 20/56* (2022.01)
*G06T 7/194* (2017.01)
(Continued)

(52) U.S. Cl.
CPC ............ *G06V 20/588* (2022.01); *G06F 18/23* (2023.01); *G06F 18/2431* (2023.01);
(Continued)

(58) Field of Classification Search
CPC ...... G06V 20/588; G06V 20/54; G06V 10/22; G06T 2207/30256; G06T 7/194;
(Continued)

(56) References Cited

U.S. PATENT DOCUMENTS

| | | | |
|---|---|---|---|
| 2018/0293457 A1* | 10/2018 | Li | ........................ G06T 7/136 |
| 2019/0266418 A1* | 8/2019 | Xu | ....................... G06V 10/764 |
| 2021/0067745 A1* | 3/2021 | Rosenberg | ........... G06V 10/764 |

FOREIGN PATENT DOCUMENTS

| | | |
|---|---|---|
| CN | 107590470 A | 1/2018 |
| CN | 109657632 A | 4/2019 |

(Continued)

OTHER PUBLICATIONS

European Patent Office; European Extended Search Report; European Application No. 21200369.3; dated Mar. 23, 2022; 8 pages.
(Continued)

*Primary Examiner* — Casey L Kretzer
(74) *Attorney, Agent, or Firm* — Faegre Drinker Biddle & Reath LLP (57) ABSTRACT

A lane line detection method, an electronic device, and a storage medium, related to the field of artificial intelligence, and particularly related to computer vision and deep learning technologies, which can be applied to intelligent traffic scenes, are provided. The method includes: dividing an image into a foreground region and a background region; determining a solid line and a dotted line included in the foreground region; determining, according to the solid line and the dotted line comprised in the foreground region, whether a dotted-and-solid line is included in the foreground region; and determining a lane line detection result according to the solid line, the dotted line, and whether a dotted-and-solid line is comprised in the foreground region. According to the technical solution, the accuracy of lane line detection can be improved.

17 Claims, 7 Drawing Sheets

(51) Int. Cl.
| | |
|---|---|
| *G06T 7/70* | (2017.01) |
| *G06V 20/54* | (2022.01) |
| *G06V 10/22* | (2022.01) |
| *G08G 1/01* | (2006.01) |
| *G06F 18/23* | (2023.01) |
| *G06F 18/2431* | (2023.01) |
| *G06F 18/2413* | (2023.01) |

(52) U.S. Cl.
CPC ........ *G06F 18/24137* (2023.01); *G06T 7/194* (2017.01); *G06T 7/70* (2017.01); *G06V 10/22* (2022.01); *G06V 20/54* (2022.01); *G08G 1/0133* (2013.01); *G06T 2207/30256* (2013.01)

(58) Field of Classification Search
CPC ..... G06T 7/70; G06F 18/23; G06F 18/24137; G06F 18/2431; G08G 1/0133
See application file for complete search history.

(56) References Cited

FOREIGN PATENT DOCUMENTS

| | | |
|---|---|---|
| CN | 110298300 A | 10/2019 |
| CN | 110334634 A | 10/2019 |
| WO | 2020/258894 A1 | 12/2020 |

OTHER PUBLICATIONS

De Paula, Mauricio Braga et al.; Automatic Detection and Classification of Road Lane Markings Using Onboard Vehicular Cameras; IEEE Transactions on Intelligent Transportation Systems; vol. 16, No. 6; Dec. 1, 2015.

Abduladhem Abdelkareem Ali et al.; Real-Time Lane Markings Recognition Based on Seed-Fill Algorithm Information and Communication Technology; Apr. 15, 2019.

China National Intellectual Property Administration; First Office Action; Chinese Application No. 202110097191.8; dated Jun. 10, 2023; 4 pages.

\* cited by examiner

LANE LINE DETECTION METHOD, ELECTRONIC DEVICE, AND COMPUTER STORAGE MEDIUM

CROSS-REFERENCE TO RELATED APPLICATION

This application claims priority to Chinese patent application No. 202110097191.8, filed on Jan. 25, 2021, which is hereby incorporated by reference in its entirety.

TECHNICAL FIELD

The present disclosure relates to the field of artificial intelligence, and in particular to computer vision and deep learning technologies, which can be applied to intelligent traffic scenes.

BACKGROUND

With the rapid development of the economy, more and more vehicles are traveling on roads, and traffic accidents and resulting losses are paid more and more attention. A lane line is the basic information in driving environment information, thus lane line detection has great importance for driving safety and the intelligent prevention and control for violating traffic regulations.

SUMMARY

The present disclosure provides a lane line detection method and apparatus, an electronic device, a storage medium, and a product.

According to an aspect of the present disclosure, there is provided a lane line detection method, including:

dividing an image into a foreground region and a background region;

determining a solid line and a dotted line included in the foreground region;

determining, according to the solid line and the dotted line included in the foreground region, whether a dotted-and-solid line is included in the foreground region; and determining a lane line detection result according to the solid line, the dotted line, and whether a dotted-and-solid line is included in the foreground region.

According to another aspect of the present disclosure, there is provided a lane line detection apparatus, including:

a classification module configured for dividing an image into a foreground region and a background region;

an identification module configured for determining a solid line and a dotted line included in the foreground region;

a first determination module configured for determining, according to the solid line and the dotted line included in the foreground region, whether a dotted-and-solid line is included in the foreground region; and a second determination module configured for determining a lane line detection result according to the solid line, the dotted line, and whether a dotted-and-solid line is included in the foreground region.

According to another aspect of the present disclosure, there is provided an electronic device, including:

at least one processor; and a memory communicatively connected with the at least one processor, wherein the memory stores instructions executable by the at least one processor, the instructions being executed by the at least one processor to enable the at least one processor to execute the method provided by any one of the embodiments of the present disclosure.

According to another aspect of the present disclosure, there is provided a non-transitory computer-readable storage medium storing computer instructions for enabling a computer to execute the method provided in any one of the embodiments of the present disclosure.

According to another aspect of the present disclosure, there is provided a computer program product including a computer program which, when executed by a processor, causes the processor to execute the method in any one of the embodiments of the present disclosure.

It should be understood that the content described in this section is neither intended to limit the key or important features of the embodiments of the present disclosure, nor intended to limit the scope of the present disclosure. Other features of the present disclosure will be readily understood through the following description.

BRIEF DESCRIPTION OF THE DRAWINGS

The drawings are used to better understand the solution and do not constitute a limitation to the present disclosure. In which.

DETAILED DESCRIPTION

Exemplary embodiments of the present disclosure are described below in combination with the drawings, including various details of the embodiments of the present disclosure to facilitate understanding, which should be considered as exemplary only. Thus, those of ordinary skill in the art should realize that various thanes and modifications can be made to the embodiments described here without departing from the scope and spirit of the present disclosure.

Likewise, descriptions of well-known functions and structures are omitted in the following description for clarity and conciseness.

Terms "first", "second", and "third" etc. in the embodiments of the description and claims of the present disclosure and the above-mentioned drawings are fir distinguishing between similar objects, and are not necessarily for describing a particular order or sequential order. Furthermore, terms "including" and "having", as well as any variations thereof, are intended to cover a non-exclusive inclusion, such as including a series of steps or units. A method, system, product, or device is not necessarily limited to those steps or units expressly listed, but may include other steps or units which are not expressly listed or inherent to such method, system, product, or device.

Figure 1:
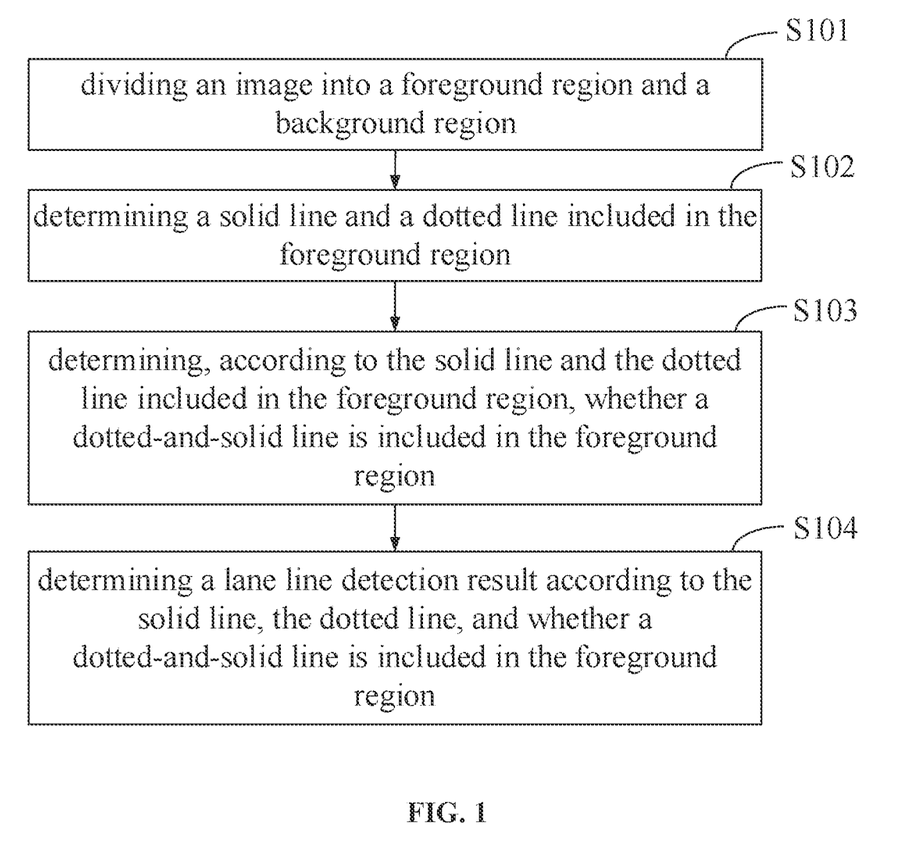
FIG. 1 is a first schematic flow diagram showing a lane line detection method according to an embodiment of the present disclosure.

The present disclosure provides a lane line detection method that may be applied to an electronic device including, but not limited to, stationary device and/or mobile device. For example, the stationary device includes, but is not limited to, a server, which may be a cloud server or a general server. For example, the mobile device includes, but is not limited to, a cell phone, a tablet computer, a vehicle-mounted device, a wearable device and the like. As shown in FIG. 1, the method includes:

S101, dividing an image into a foreground region and a background region;

S102, determining a solid line and a dotted line included in the foreground region;

S103, determining, according to the solid line and the dotted line included in the foreground region, whether a dotted-and-solid line is included in the foreground region; and S104, determining a lane line detection result according to the solid line, the dotted line, and whether a dotted-and-solid line is included in the foreground region.

According to the technical solution of the present disclosure, the accuracy of lane line detection can be improved.

The present disclosure does not limit a manner in which the image is acquired. Illustratively, the electronic device receives an image through an external interface. As yet another example, the electronic device receives an image forwarded by other device. The present disclosure does not limit an image acquisition device. For example, the image may further be acquired by an unmanned aerial vehicle, or by a shooting device such as a camera mounted on a vehicle, or by a shooting device above a road.

The present disclosure does not limit a frequency at which images are acquired, a speed per hour at which images are acquired, a flying height at which images are acquired, and the like.

In the present disclosure, the image may include, in addition to the lane line image, terrain information and environmental information, etc. of a place where a lane line is located.

The foreground region is a road region to be detected in the image, such as a high-speed road region, or a general road region.

The background region is a region except for the road region to be detected in the image.

In some implementations, the road region to be detected is regarded as a foreground, and a foreground region and a background region in an image are obtained by performing binarization segmentation on the image. It should be noted that the present disclosure does not limit a binarization method employed. Illustratively, an image may be segmented into a foreground region and a background region by using a binarization method of a global thresholding method, or a binarization method of a local thresholding method, or a binarization method of an adaptive thresholding method.

Of course, non-binarization methods may also be used to segment a foreground region and a background region in an image. The present disclosure does not limit a segmentation manner of the foreground region and the background region.

Therefore, the interference of the background region on lane line detection can be effectively avoided by determining the foreground region and the background region of the image to only identifying and processing the foreground region subsequently.

In the present disclosure, lane lines can be divided into dotted, solid, and dotted-and-solid lines. The lane line has a plurality of attributes, such as a color attribute, a thickness attribute, and a dotted and solid attribute. The color attribute refers to the color of the lane line, such as yellow, white, etc. The thickness attribute refers to whether the lane line is a thick line or a thin line. The thin line may refer to a common dotted line, solid line, etc. The thick line refers to a lane line having a width larger than that of the thin line, such as a flow guiding line, etc. The dotted and solid attribute refers to whether the lane line is a dotted line or a solid line.

In the present disclosure, the lane lines may be specifically further subdivided into double yellow solid lines, single yellow solid lines, double yellow dotted lines, single yellow dotted lines, single white solid lines, and single white dotted lines. It will be appreciated that, in practice, different types of lane lines have different traffic indication functions.

Figure 2A:
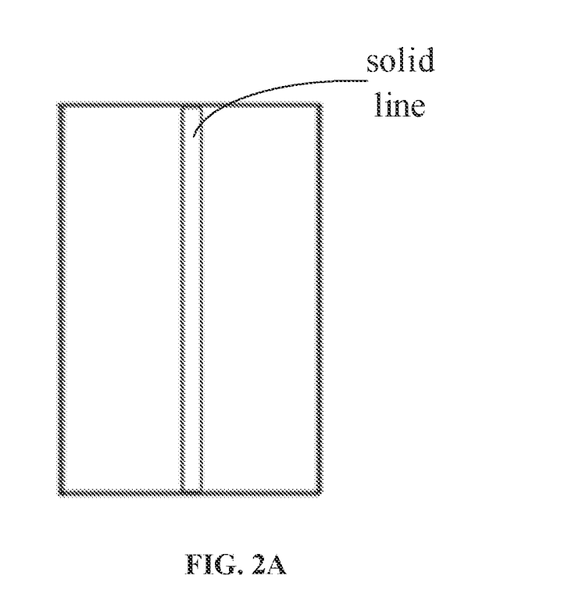
FIGS. 2A-2C are schematic diagrams of lane lines provided by embodiments of the present disclosure.

FIG. 2A shows a schematic diagram of a solid-line lane line in an actual application, a single yellow solid line in a road indicates that a vehicle is not allowed to drive across the line to overtake another vehicle or drive on the line, and is generally used to divide a road having only one lane or one motorized vehicle lane and one non-motorized vehicle lane in a single direction. A single white solid line in a road is the dividing line of a lane, allowing vehicles to drive on respective lanes without influencing each other. A double yellow solid line in a road is used to divide a road having two or more motorized vehicle lanes respectively in an uplink direction and a downlink direction, without being arranged with a median strip. The double yellow solid line strictly prohibits a vehicle from driving across the line to overtake another vehicle or driving on the line.

Figure 2B:
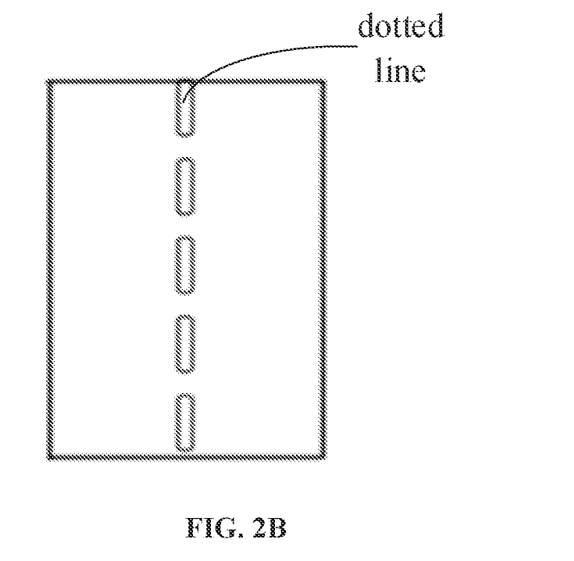

FIG. 2B shows a schematic diagram of a dotted-line lane line. A single dotted line in a road indicates that a vehicle can drive across the line to overtake another vehicle or turn around while ensuring safety. Vehicles on two lanes can turn around and turn left. A double yellow dotted line in a road indicates that a vehicle may turn left but cannot turn around on the double yellow dotted line on the main road in a case of security and without affecting traffic.

Figure 2C:
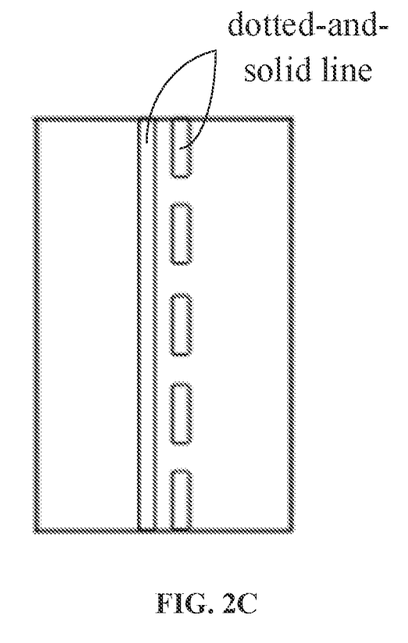

FIG. 2C shows a schematic diagram of a dotted-and-solid line lane line. As shown in FIG. 2C, a dotted-and-solid line includes a dotted line and a solid line, and a distance between the dotted line and the solid line included in the dotted-and-solid line is smaller than a certain threshold. In an actual application, a vehicle on the dotted line side is allowed to temporarily drive across the dotted line to overtake another vehicle, or turn around and turn a corner, while a vehicle on the solid line side is not allowed to drive on the solid line, otherwise, it violates traffic regulations.

FIGS. 2A-2C are merely a few possible examples and the present embodiment is not limited thereto. It will be appreciated that traffic regulations in different regions may be different and that the above explanations of the traffic regulations for solid, dotted, and dotted-and-solid lines are merely illustrative and not limited thereto.

The lane line detection result includes solid line information, dotted line information, and information about whether dotted-and-solid line exists, as well as specific information of a dotted-and-solid line in a case where the dotted-and-solid line exists. The solid line information may include one or more of identification information, quantity information, position information, color information, and thickness information. Similarly, the dotted line information may include one or more of identification information, position information, color information, and thickness information. The dotted-and-solid line information may include one or more of identification information, position information, color information, and thickness information. The thickness information represents the width of the solid line or the dotted line or the dotted-and-solid line. The identification information represents the number of the solid line or the dotted line or the dotted-and-solid line. The quantity information represents the quantity of the solid line or the dotted line or the dotted-and-solid line.

Illustratively, the lane line detection result includes, in a road region, an identification and position of a solid line, an identification and position of a dotted line, whether there being a dotted-and-solid line, and an identification and position of a dotted-and-solid line in a case where there is the dotted-and-solid line.

For another example, the lane line detection result includes, in a road region, an identification, color and position of a solid line, an identification, color and position of a dotted line, whether there being a dotted-and-solid line, and an identification, color and position of a dotted-and-solid line in a case where there is the dotted-and-solid line.

For a further example, the lane line detection result includes, in a road region, a position, color and width of a solid line, a position, color and width of a dotted line, whether there being a dotted-and-solid line, and a position, color and width of a dotted-and-solid line in a case where there is the dotted-and-solid line.

It should be noted that the specific information of the solid line, the dotted line, and the dotted-and-solid line included in the lane line detection result may be set or adjusted according to actual requirements such as detection accuracy or detection speed or detection item requirements.

Therefore, according to the solution disclosed by the present disclosure, an image is divided into a foreground region and a background region; a solid line and a dotted line included in the foreground region are determined; whether a dotted-and-solid line is included in the foreground region is determined according to the solid line and the dotted line included in the foreground region; a lane line detection result is determined according to the solid line, the dotted line and whether a dotted-and-solid line is included in the foreground region. Therefore, whether a dotted-and-solid line is included in the foreground region can be identified, so that the lane line detection result includes relevant information of the dotted-and-solid line, the lane line detection accuracy is improved, a reference basis is provided for subsequently judging whether a vehicle violates traffic regulations, and data support is provided for intelligently monitoring the traffic regulations violating behavior of a vehicle.

In an embodiment of the present disclosure, on the basis of implementing any one of the above methods, the determining a solid line and a dotted line included in the foreground region includes: in a case where an area of the foreground region is larger than a first preset threshold, determining the solid line and the dotted line included in the foreground region.

The first preset threshold can be set or adjusted according to actual conditions such as detection accuracy requirements or detection speed requirements.

As such, not all received images are analyzed and processed, and only an image with a foreground region larger than the first preset threshold is subjected to subsequent identification and processing.

Through the above implementation, some images with no reference value or small reference value are eliminated by judging the area of the foreground region in the image, so that the detection speed of the lane line can be improved and the detection accuracy of the lane line can be improved.

Figure 3:
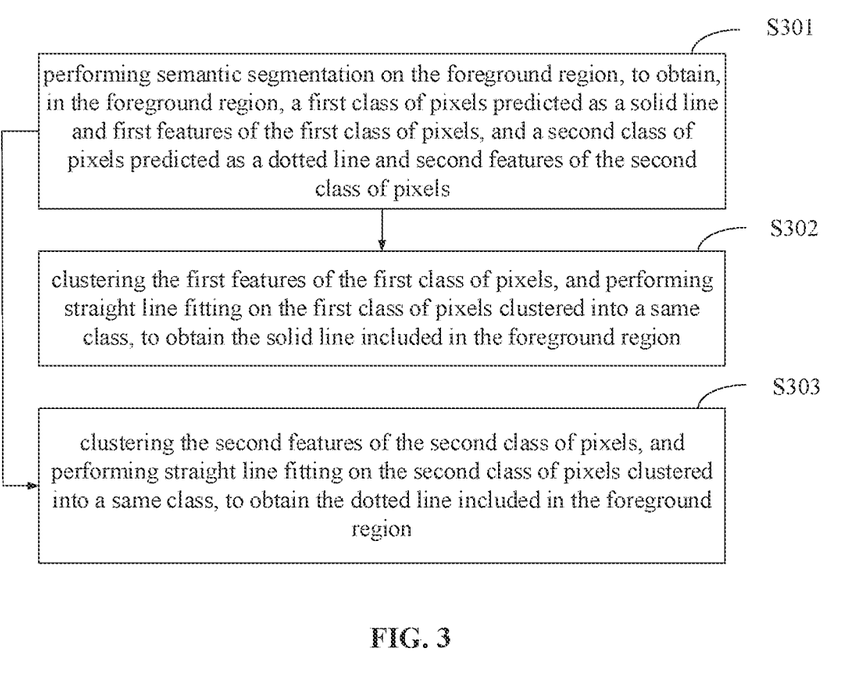
FIG. 3 is a schematic flow diagram for determining a solid line and a dotted line included in a foreground region according to an embodiment of the present disclosure.

In an embodiment of the present disclosure, on the basis of implementing any one of the above methods, as shown in FIG. 3, the determining a solid line and a dotted line included in the foreground region includes:

S301, performing semantic segmentation on the foreground region, to obtain, in the foreground region, a first class of pixels predicted as a solid line and first features of the first class of pixels, and a second class of pixels predicted as a dotted line and second features of the second class of pixels;

S302, clustering the first features of the first class of pixels, and performing straight line fitting on the first class of pixels clustered into a same class, to obtain the solid line included in the foreground region; and S303, clustering the second features of the second class of pixels, and performing straight line fitting on the second class of pixels clustered into a same class, to obtain the dotted line included in the foreground region.

It should be rioted that the present disclosure does not limit the order in which S302 and S303 are executed. S302 may be executed before S303, or may be executed after S303, or may be executed in synchronization with S303.

In some implementations, semantic segmentation is performed on the foreground region through a trained model, to obtain, in the foreground region, a first class of pixels predicted as a solid line and first features of the first class of pixels, and a second class of pixels predicted as a dotted line and second features of the second class of pixels. Specifically, the foreground region is input into the trained model, and the trained model outputs, in the foreground region, a first class of pixels predicted as a solid line and first features of the first class of pixels, and a second class of pixels predicted as a dotted line and second features of the second class of pixels. As such, it is facilitated that the first class of pixels and the first features of the first class of pixels, and the second class of pixels and the second features of the second class of pixels can be quickly obtained through the trained model, and a calculation basis is provided for subsequently determining the solid line and the dotted line in the foreground region.

The present disclosure does not impose mandatory restrictions on how to train a model. Illustratively, the binary-classification semantic annotation of the solid line and the dotted line, and the lane example annotation both serve as model supervision signals. The model is divided into two branches, one branch is for predicting a semantic segmentation result, dividing into two classes (solid line, and dotted line) or three classes (background, solid line, and dotted line), and the other branch is for predicting example feature information, and outputting features of each pixel. A specific network structure and loss design can use lanenet, for example, and will not be described in detail here.

In some implementations, clustering the first features of the first class of pixels includes: clustering by calculating an L2 distance of the first feature of each first class of pixels, and classifying the first class of pixels with a distance smaller than a first threshold into a same class. Illustratively, there are 100 first pixel points, numbered as 1 to 100, wherein the L2 distances of the first features of the first pixel points numbered 1, 10, 21, 33, 45, 51, 60, 72, 83, 91, and 99 are less than the first threshold, and the pixel points are classified as a same class and are recorded as solid line 1; the L2 distances of the first features of the first pixel points numbered 2, 20, 31, 43, 52, 61, 70, 82, 93, and 98 are less than the first threshold and the pixel points are classified as a same class and are recorded as solid line 2. According to the method, 100 first pixel points are divided into a plurality of classes of first pixel points; wherein a same class corresponds to a same solid line. The first threshold can be set or adjusted according to requirements such as accuracy requirements or speed requirements.

In some implementations, clustering the second features of the second class of pixels includes: clustering by calculating an L2 distance of the second feature of each second class of pixels, and classifying the second class of pixels with a distance smaller than a second threshold into a same class. Illustratively, there are 50 second pixel points, numbered as 101 to 150, wherein the L2 distances of the second features of the second pixel points numbered 101, 109, 121, 130, 145, and 149, are less than the second threshold, and the pixel points are classified as a same class and are recorded as dotted line 1; the L2 distances of the second features of the second pixel points numbered 102, 120, 131, 143 and 148 are less than the second threshold, and the pixel points are classified as a same class and are recorded as dotted line 2. The second threshold can be set or adjusted according to requirements such as accuracy requirements or speed requirements.

Of course, in addition to employing the L2 distance clustering method, other clustering methods may further be employed, such as an L1 norm clustering algorithm, etc., where no more enumerations are made.

The present disclosure does not limit a straight line fitting method. Illustratively, a straight line fitting is performed by employing a least square method. As another example, a straight line fitting is performed by employing a random sample consensus (RANSAC) algorithm.

Through the above implementation, a solid line and a dotted line in the foreground region can be identified, so that a judgment basis is provided for subsequently judging whether the foreground region includes a dotted-and-solid line.

Figure 4:
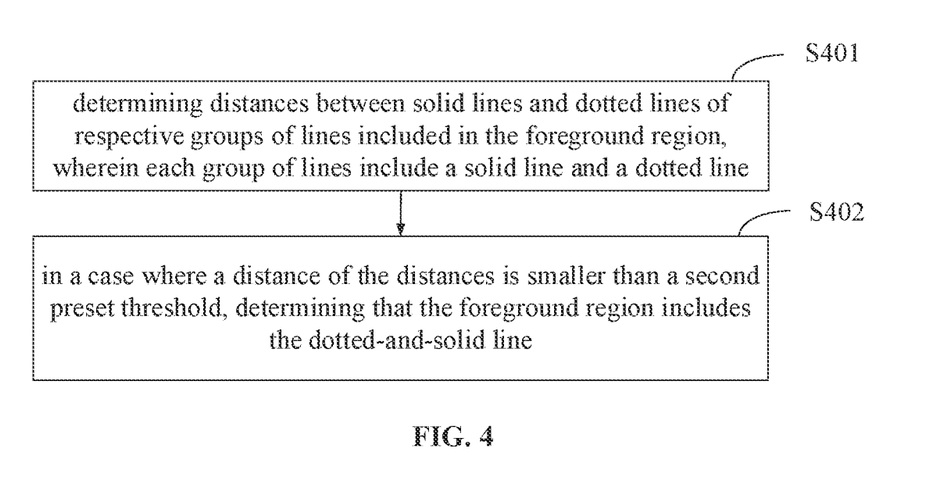
FIG. 4 is a first schematic flow diagram of determining whether a foreground region includes a dotted-and-solid line according to an embodiment of the present disclosure.

In an embodiment of the present disclosure, on the basis of implementing any one of the above methods, as shown in FIG. 4, whether the determining, according to the solid line and the dotted line included in the foreground region, whether a dotted-and-solid line is included in the foreground region, includes:

S401, determining distances between solid lines and dotted lines of respective groups of lines included in the foreground region, wherein each group of lines include a solid line and a dotted line; and S402, in a case where a distance of the distances is smaller than a second preset threshold, determining that the foreground region includes the dotted-and-solid line.

The second preset threshold can be set or adjusted according to actual conditions such as widths of dotted-and-solid lines in different roads.

In some implementations, provided that the foreground region includes M solid lines and N dotted lines, taking the solid lines as references, each solid line corresponds to N groups of dotted lines, so there are a total of M×N groups of solid lines and dotted lines. Herein, M and N are integers larger than zero. The distances between the solid lines and the dotted lines in respective groups of the M×N groups are calculated respectively. In a case where one or more distances of the distances is smaller than a second preset threshold, it is judged that the foreground region includes a dotted-and-solid line; and a solid line and a dotted line with a distance smaller than the second preset threshold are called the dotted-and-solid line.

In some implementations, provided that the foreground region includes M solid lines and N dotted lines, taking the dotted lines as references, each dotted line corresponds to M groups of solid lines, so there are a total of N×M groups of solid lines and dotted lines. The distances between the solid lines and the dotted lines in respective groups of the N groups are calculated respectively. A group including a solid line and a dotted line where the distance between the solid line and the dotted line is less than the second preset threshold is called a dotted-and-solid line. In a case where one or more distances of the distances is smaller than a second preset threshold, it is judged that the foreground region includes a dotted-and-solid line; and a solid line and a dotted line with a distance smaller than the second preset threshold are called the dotted-and-solid line.

Though the above implementation, whether the foreground region includes a dotted-and-solid line can be judged according to the distance between each group of solid line and dotted line included in the foreground region, so that the dotted-and-solid line information is provided for subsequently generating a lane line detection result, and the accuracy of the lane line detection result is improved.

In an embodiment of the present disclosure, on the basis of implementing any one of the above methods, the determining distances between solid lines and dotted lines of respective groups of lines included in the foreground region includes:

selecting a plurality of points in the solid line or the dotted line, for the solid line and the dotted line of a group of lines; and calculating an average value of distances from a plurality of points in the solid line or the dotted line to the dotted line or the solid line of the corresponding group of lines, and taking the average value as the distance between the solid line and the dotted line.

The plurality of points may be uniformly distributed or non-uniformly distributed. The number of points selected for different solid lines or dotted lines may be different.

The average value may be an arithmetic average value, or a geometric average value, or a squared average value, or a weighted average value, etc. The present disclosure does not limit the form of the average value.

Illustratively, the foreground region includes two solid lines, recorded as solid line A and solid line B respectively. The foreground region further includes two dotted lines, recorded as dotted line a and dotted line b respectively. The solid line A and the dotted line a are recorded as a first group; the solid line A and the dotted line b are recorded as a second group; the solid line B and the dotted line a are recorded as a third group; and the solid line B and the dotted line b are recorded as a fourth group. In some implementations, taking the first group as an example, p points are selected from the solid line A, and distances from the p points to the dotted line a are calculated respectively, to obtain the distances from the p points to the dotted line a as $S_{1a}, S_{2a}, \ldots,$ and $S_{pa}$. $S_{1a}, S_{2a}, \ldots,$ and $S_{pa}$ are averaged, and the average value is taken as the distance between the solid line A and the dotted line a. Further taking the first group as an example, in other implementations, q points are selected from the dotted line a, and distances from the q points to the solid line A are calculated respectively, to obtain the distances from the q points to the solid line A as $S_{1A}, S_{2A}, \ldots,$ and $S_{qA}$. $S_{1A}, S_{2A}, \ldots,$ and $S_{qA}$ are averaged, and the average value is taken as the distance between the solid line A and the dotted line a.

Through the above implementation, the distance between a solid line and a dotted line is determined by sampling a plurality of points, so that the speed of determining the distance between the solid line and the dotted line can be increased. Therefore, it helps to quickly determine whether a dotted-and-solid line is included in the foreground region, and improves the speed of determining whether a dotted-and-solid line is included in the foreground region.

Figure 5:
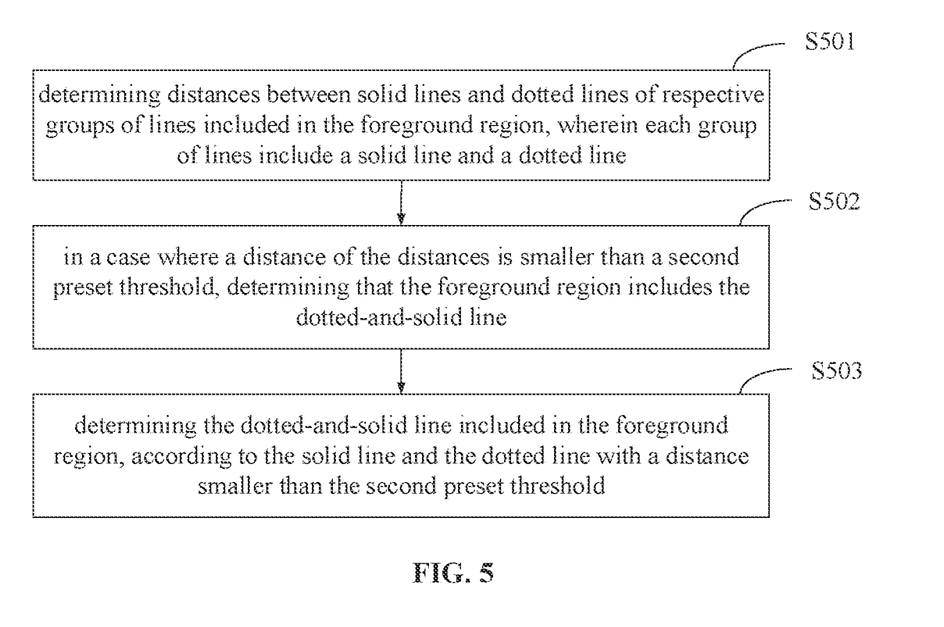
FIG. 5 is a second schematic flow diagram of determining whether a foreground region includes a dotted-and-solid line according to an embodiment of the present disclosure.

In an embodiment of the present disclosure, on the basis of implementing any one of the above methods, as shown in FIG. 5, S501 and S502 shown in FIG. 5 are operations same as or similar to S401 and S402 shown in FIG. 4, respectively, and the method further includes:

S503, determining the dotted-and-solid line included in the foreground region, according to the solid line and the dotted line with a distance smaller than the second preset threshold.

The determining the dotted-and-solid line included in the foreground region specifically includes determining one or more of the position, identification, color, and width of the dotted-and-solid line included in the foreground region.

Continuing with the above example, the foreground region includes two solid lines, recorded as solid line A and solid line B respectively. The foreground region further includes two dotted lines, recorded as dotted line a and dotted line b respectively. The solid line A and the dotted line a are recorded as a first group; the solid line A and the dotted line b are recorded as a second group; the solid line B and the dotted line a are recorded as a third group; and the solid line B and the dotted line b are recorded as a fourth group. In a case where only the distance between the solid line A and the dotted line a included in the first group in the four groups is smaller than the second preset threshold, it is determined that the foreground region includes a dotted-and-solid line, and the dotted-and-solid line includes the solid line A and the dotted line a.

The determining a lane line detection result according to the solid line, the dotted line, and whether a dotted-and-solid line is included in the foreground region includes: determining the lane line detection result according to relevant information of the solid line, relevant information of the dotted line and relevant information of the dotted-and-solid line.

In some implementations, the determining the lane line detection result according to relevant information of the solid line, relevant information of the dotted line and relevant information of the dotted-and-solid line includes: determining the lane line detection result according to an attribute of the solid line, an attribute of the dotted line and an attribute of the dotted-and-solid line.

Here, the attribute includes, but is not limited to, a color attribute, a thickness attribute, a position attribute, etc.

Therefore, by combining the attributes of various lane lines, the determined lane line detection result is more comprehensive, and the accuracy of the detection result is improved.

Through the above implementation, in a case where the lane line detection result is determined, besides considering the solid line and the dotted line, relevant information of the dotted-and-solid line is added, so that the lane line detection result is determined more comprehensively, the accuracy of the lane line detection result can be improved, and a basis is provided for the subsequent judgment of a vehicle violating traffic regulations.

Figure 6:
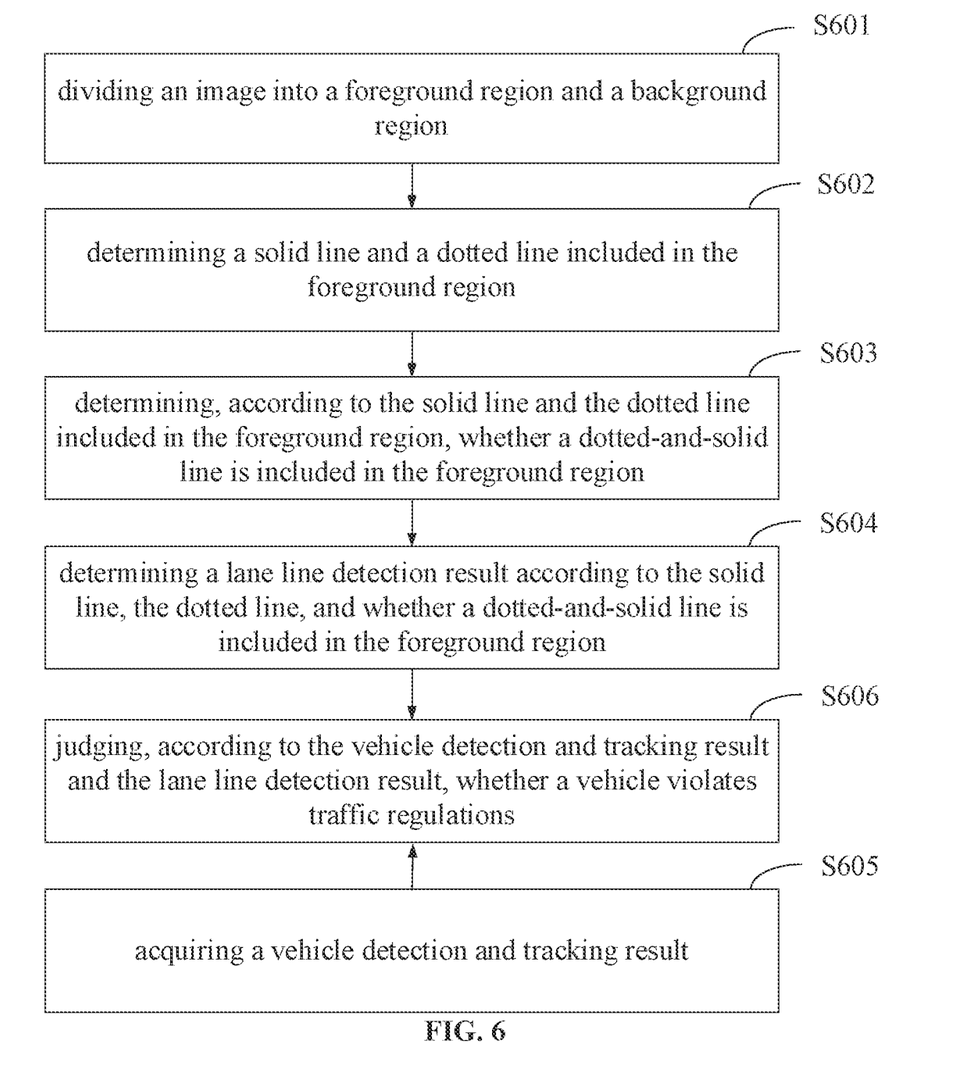
FIG. 6 is a second schematic flow diagram showing a lane line detection method according to an embodiment of the present disclosure.

In an embodiment of the present disclosure, on the basis of implementing any one of the above methods, as shown in FIGS. 6, S601, S602, S603 and S604 shown in FIG. 6 are operations same as or similar to S101, S102, S103 and S102 shown in FIG. 1, respectively, and the method further includes:

S605, acquiring a vehicle detection and tracking result and

S606, judging, according to the vehicle detection and tracking result and the lane line detection result, whether a vehicle violates traffic regulations.

The vehicle detection and tracking result includes vehicle position information, and can also include one or more of vehicle driving direction information, vehicle speed information, license plate information, and vehicle class information. Of course, the vehicle detection and tracking result may also increase or decrease a detection item according to actual detection requirements.

The present disclosure does not limit the manner in which the vehicle detection and tracking result is acquired. Illustratively, the electronic device receives a vehicle detection and tracking result uploaded by a monitoring device, such as a vehicle-mounted device, through an external interface. As yet another example, the electronic device receives the vehicle detection and tracking result transmitted by other device, such as image acquisition device.

In some implementations, the judging, according to the vehicle detection and tracking result and the lane line detection result, whether a vehicle violates traffic regulations, includes: judging, according to the vehicle detection and tracking result and the lane line detection result, whether a vehicle violating traffic regulations exists in a road, in combination with traffic regulations.

Illustratively, whether a vehicle is on a line currently and is allowed to be on the line is judged, or whether a vehicle is allowed to turn around currently is judged, or whether the current parking position of a vehicle allows the vehicle to park is judged, according to the dotted line, the solid line, and the dotted-and-solid line in the lane line detection result.

Figure 7:
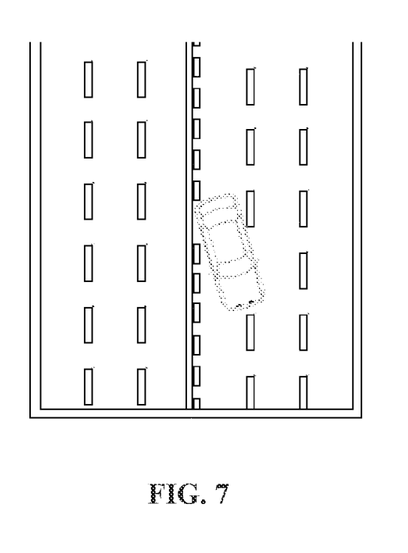
FIG. 7 is a schematic diagram of judging, according to a vehicle detection result and a lane line detection result, whether a vehicle violates traffic regulations according to an embodiment of the present disclosure.

FIG. 7 shows a schematic diagram for judging whether a vehicle violates traffic regulations according to a vehicle detection result and a lane line detection result. As shown in FIG. 7, a vehicle's head is above a dotted-line traffic lane, and the vehicle's tail overlays the dotted line portion of a dotted-and-solid line in a vertical direction. Since a vehicle can be on the dotted line or drive across the dotted line, and a vehicle at a dotted line side of the dotted-and-solid line is allowed to temporarily drive across the dotted line of the dotted-and-solid line, it is judged that the vehicle currently complies with traffic regulations.

Through the above implementation, after the lane line prediction is finished, traffic regulations violating events such as a vehicle changing a lane through a solid line can be judged by combining a vehicle detection and tracking result, so that the real-time supervision of a vehicle violating traffic regulations while driving is facilitated, and the problem of missing shooting of a vehicle violating traffic regulations while driving is solved.

It should be understood that the schematic diagram shown in FIG. 7 is an alternative specific implementation, and that various obvious changes and/or substitutions may be made by those skilled in the art based on the example of FIG. 7, while the obtained technical solution remains within the scope of the embodiments of the present disclosure.

The lane line detection method provided by the present disclosure can be used in lane line detection items, or navigation items, or monitoring items for vehicles violating traffic regulations, or intelligent prevention and control systems for vehicles violating traffic regulations, and other items. Illustratively, the execution body of the method may be an electronic device, which may be a terminal or a server.

Figure 8:
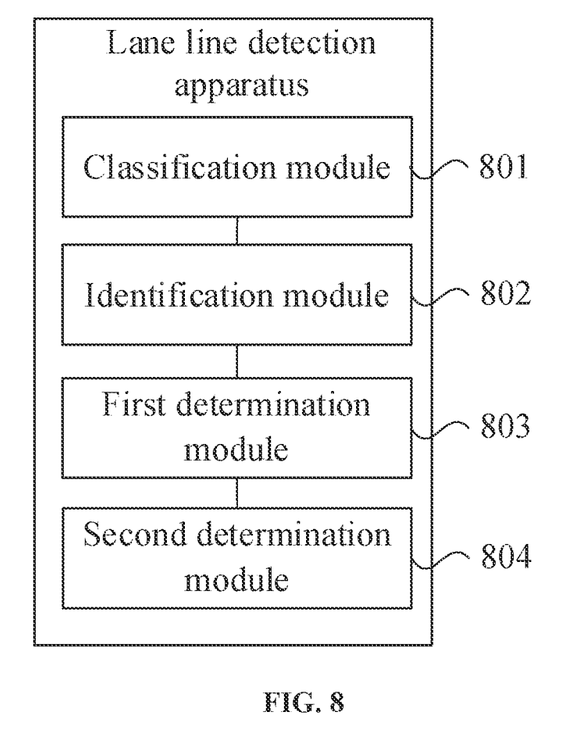
FIG. 8 is a first schematic diagram showing a structure of a lane line detection apparatus according to an embodiment of the present disclosure.

As an implementation of each of the above methods, the present disclosure also provides a lane line detection apparatus. FIG. 8 shows a schematic diagram of the lane line detection apparatus. As shown in FIG. 8, the lane line detection apparatus includes:

a classification module 801 configured for dividing an image into a foreground region and a background region;

an identification module 802 configured for determining a solid line and a dotted line included in the foreground region;

a first determination module 803 configured for determining, according to the solid line and the dotted line included in the foreground region, whether a dotted-and-solid line is included in the foreground region; and a second determination module 804 configured for determining a lane line detection result according to the solid line, the dotted line, and whether a dotted-and-solid line is included in the foreground region.

In some implementations, the identification module 802 is specifically configured for:

In a case where an area of the foreground region is larger than a first preset threshold, determining a solid line and a dotted line included in the foreground region.

In some implementations, the identification module 802 is specifically configured for:

performing semantic segmentation on the foreground region, to obtain, in the foreground region, a first class of pixels predicted as a solid line and first features of the first class of pixels, and a second class of pixels predicted as a dotted line and second features of the second class of pixels;

clustering the first features of the first class of pixels, and performing straight line fitting on the first class of pixels clustered into a same class, to obtain the solid line included in the foreground region; and clustering the second features of the second class of pixels, and performing straight line fitting on the second class of pixels clustered into a same class, to obtain the dotted line included in the foreground region.

In some implementations, the first determination module 803 is specifically configured for:

determining distances between solid lines and dotted lines of respective groups of lines included in the foreground region, wherein each group of lines include a solid line and a dotted line; and in a case where a distance of the distances is smaller than a second preset threshold, determining that the foreground region includes the dotted-and-solid line.

Figure 9:
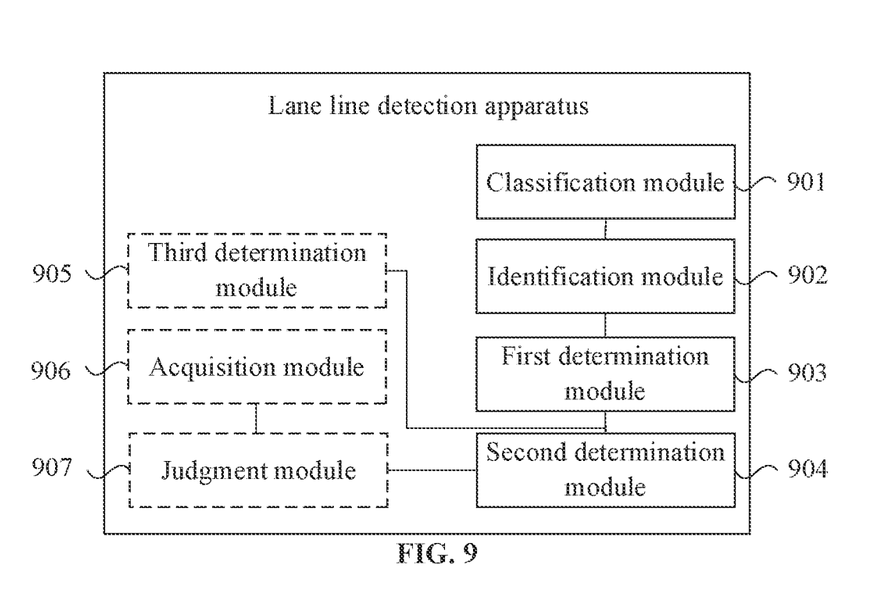
FIG. 9 is a second schematic diagram showing a structure of a lane line detection apparatus according to an embodiment of the present disclosure.

In some implementations, as shown in FIG. 9, the classification module 901, the identification module 902, the first determination module 903 and the second determination module 904 shown in FIG. 9 are modules same as or similar to the classification module 801, the identification module 802, the first determination module 803 and the second determination module 804 shown in FIG. 8, respectively, and the first determination module 903 is specifically configured for:

selecting a plurality of points in the solid line or the dotted line, for the solid line and the dotted line of a group of lines; and calculating an average value of distances from a plurality of points in the solid line or the dotted line to the dotted line or the solid line of the group of lines, and taking the average value as the distance between the solid line and the dotted line.

In some implementations, as shown in FIG. 9, the apparatus may further include: a third determination module 905, wherein the third determination module 905 is configured for determining the dotted-and-solid line included in the foreground region, according to the solid line and the dotted line with a distance smaller than the second preset threshold; and wherein the second determination module 904 is further configured for:

determining the lane line detection result according to an attribute of the solid line, an attribute of the dotted line and an attribute of the dotted-and-solid line.

In some implementations, as shown in FIG. 9, the apparatus may further include:

an acquisition module 906 configured for acquiring a vehicle detection and tracking result; and a judgment module 907 configured for judging, according to the vehicle detection and tracking result and the lane line detection result, whether a vehicle violates traffic regulations.

The functions of each module in each apparatus of the embodiments of the present disclosure can be referred to the corresponding description of the above-mentioned lane line detection method, and will not be described in detail herein.

The lane line detection apparatus of the present disclosure can improve the accuracy of lane line detection, thereby being beneficial to improve the speed and accuracy of detecting whether a vehicle violates traffic regulations.

According to embodiments of the present disclosure, the present disclosure also provides an electronic device, a readable storage medium and a computer program product.

Figure 10:
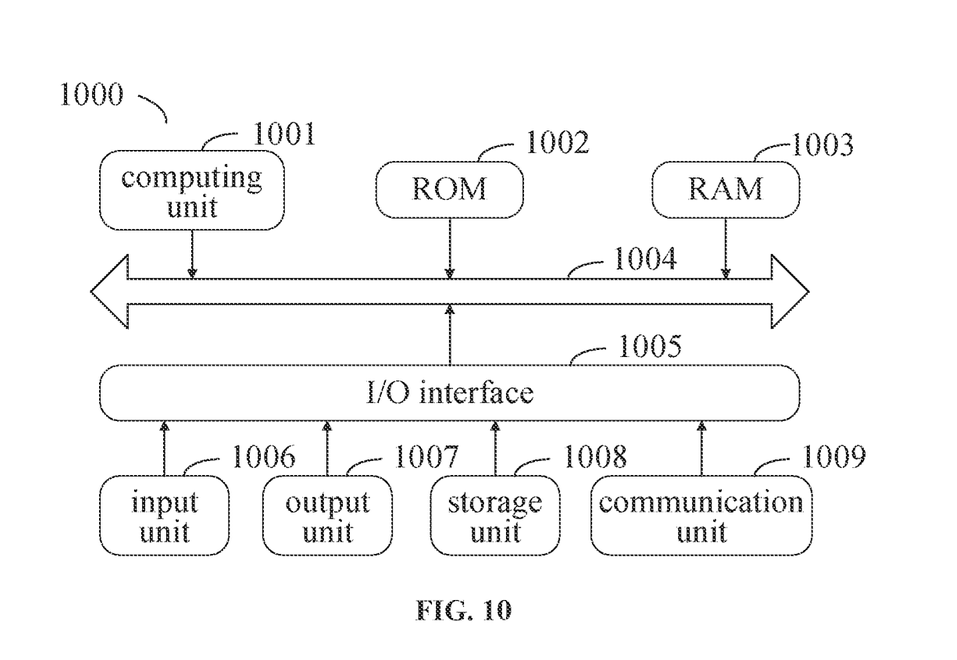
FIG. 10 is a block diagram of an electronic device used to implement the lane line detection method of an embodiment of the present disclosure.

FIG. 10 shows a schematic block diagram of an example electronic device 1000 that may be used to implement embodiments of the present disclosure. The electronic device is intended to represent various forms of digital computers, such as laptop computers, desktop computers, workstations, personal digital assistants, servers, blade servers, mainframe computers, and other suitable computers. The electronic device may also represent various forms of mobile devices, such as a personal digital assistant, a cellular telephone, a smart phone, a wearable device, and other similar computing devices. The components shown herein, their connections and relationships, and their functions are by way of example only and are not intended to limit the implementations of the present disclosure described and/or claimed herein.

As shown in FIG. 10, the electronic device 1000 includes a computing unit 801 that may perform various suitable actions and processes in accordance with computer programs stored in a read only memory (ROM) 1002 or computer programs loaded from a storage unit 1008 into a random access memory (RAM) 1003. In the RAM 1003, various programs and data required for the operation of the electronic device 1000 may also be stored. The computing unit 1001, the ROM 1002 and the RAM 1003 are connected to each other through a bus 1004. An input/output (I/O) interface 1005 is also connected to the bus 1004.

A plurality of components in the electronic device 1000 are connected to the I/O interface 1005, including: an input unit 1006, such as a keyboard, a mouse, etc.; an output unit 1007, such as various types of displays, speakers, etc.; a storage unit 1008, such as a magnetic disk, an optical disk, etc.; and a communication unit 1009, such as a network card, a modem, a wireless communication transceiver, etc. The communication unit 1009 allows the electronic device 1000 to exchange information data with other devices over a computer network, such as the Internet, and/or various telecommunications networks.

The computing unit 1001 may be various general purpose and/or special purpose processing assemblies having processing and computing capabilities. Some examples of the computing unit 1001 include, but are not limited to, a central processing unit (CPU), a graphics processing unit (GPU), various specialized artificial intelligence (AI) computing chips, various computing units running machine learning model algorithms, a digital signal processor (DSP), and any suitable processor, controller, microcontroller, etc. The computing unit 1001 performs various methods and processes described above, such as the lane line detection method. For example, in some embodiments, the lane line detection method may be implemented as computer software programs that are physically contained in a machine-readable-medium, such as the storage unit 1008. In some embodiments, some or all of the computer programs may be loaded into and/or installed on the electronic device 1000 via the ROM 1002 and/or the communication unit 1009. In a case where the computer programs are loaded into the RAM 1003 and executed by the computing unit 1001, one or more of steps of the lane line detection method may be performed. Alternatively, in other embodiments, the computing unit 1001 may be configured to perform the lane line detection method in any other suitable manner (e.g., by means of a firmware).

Various implementations of the systems and techniques described herein above may be implemented in a digital electronic circuit system, an integrated circuit system, a field programmable gate array (FPGA), an application specific integrated circuit (ASIC), an application specific standard product (ASSP), a system on a chip (SOC), a load programmable logic device (CPLD), a computer hardware, a firmware, a software, and/or a combination thereof. These various implementations may include an implementation in one or more computer programs, which can be executed and/or interpreted on a programmable system including at least one programmable processor; the programmable processor may be a dedicated or general-purpose programmable processor and capable of receiving and transmitting data and instructions from and to a storage system, at least one input device, and at least one output device.

The program codes for implementing the methods of the present disclosure may be written in any combination of one or more programming languages. These program codes may be provided to a processor or controller of a general purpose computer, a special purpose computer, or other programmable data processing apparatus such that the program codes, when executed by the processor or controller, enable the functions/operations specified in the flowchart and/or the block diagram to be performed. The program codes may be executed entirely on a machine, partly on a machine, partly on a machine as a stand-alone software package and partly on a remote machine, or entirely on a remote machine or server.

In the context of the present disclosure, the machine-readable medium may be a tangible medium that may contain or store programs for using by or in connection with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination thereof. More specific examples of the machine-readable storage medium may include one or more wire-based electrical connection, a portable computer diskette, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination thereof.

In order to provide an interaction with a user, the system and technology described here may be implemented on a computer having: a display device (e.g., a cathode ray tube (CRT) or a liquid crystal display (LCD) monitor) for displaying information to the user; and a keyboard and a pointing device (e.g., a mouse or a trackball), through which the user can provide an input to the computer. Other kinds of devices can also provide an interaction with the user. For example, a feedback provided to the user may be any form of sensory feedback (e.g., visual feedback, auditory feedback, or tactile feedback) and an input from the user may be received in any form, including an acoustic input, a voice input or a tactile input.

The systems and techniques described herein may be implemented in a computing system (e.g., as a data server) that may include a background component, or a computing system (e.g., an application server) that may include a middleware component, or a computing system (e.g., a user computer having a graphical user interface or a web browser through which a user may interact with embodiments of the systems and techniques described herein) that may include a front-end component, or a computing system that may include any combination of such background components, middleware components, or front-end components. The components of the system may be connected to each other through a digital data communication in any form or medium (e.g., a communication network). Examples of the communication network may include a local area network (LAN), a wide area network (WAN), and the Internet.

The computer system may include a client and a server. The client and the server are typically remote from each other and typically interact via the communication network. The relationship of the client and the server is generated by computer programs running on respective computers and having a client-server relationship with each other.

It should be understood that the steps can be reordered, added or deleted using the various flows illustrated above. For example, the steps described in the present disclosure may be performed concurrently, sequentially or in a different order, so long as the desired results of the technical solutions disclosed in the present disclosure can be achieved, and there is no limitation herein.

The above-described specific embodiments do not limit the scope of the present disclosure. It will be apparent to those skilled in the art that various modifications, combinations, sub-combinations and substitutions are possible, depending on design requirements and other factors. Any modifications, equivalent substitutions, and improvements within the spirit and principles of the present disclosure are intended to be included within the scope of the present disclosure.

What is claimed is:

1. A lane line detection method, comprising:
dividing an image into a foreground region and a background region;
determining a solid line and a dotted line comprised in the foreground region;
determining, according to the solid line and the dotted line comprised in the foreground region, whether a dotted-and-solid line is comprised in the foreground region; and
determining a lane line detection result according to the solid line, the dotted line, and whether a dotted-and-solid line is comprised in the foreground region,
wherein the determining a solid line and a dotted line comprised in the foreground region, comprises:
performing semantic segmentation on the foreground region, to obtain, in the foreground region, a first class of pixels predicted as a solid line and first features of the first class of pixels, and a second class of pixels predicted as a dotted line and second features of the second class of pixels;
clustering the first features of the first class of pixels, and performing straight line fitting on the first class of pixels clustered into a same class, to obtain the solid line comprised in the foreground region; and
clustering the second features of the second class of pixels, and performing straight line fitting on the second class of pixels clustered into a same class, to obtain the dotted line comprised in the foreground region.

2. The method of claim 1, wherein the determining a solid line and a dotted line comprised in the foreground region, further comprises:
in a case where an area of the foreground region is larger than a first preset threshold, determining the solid line and the dotted line comprised in the foreground region.

3. The method of claim 1, wherein the determining, according to the solid line and the dotted line comprised in the foreground region, whether a dotted-and-solid line is comprised in the foreground region, comprises:
determining distances between solid lines and dotted lines of respective groups of lines comprised in the foreground region, wherein each group of lines comprise a solid line and a dotted line; and
in a case where a distance of the distances is smaller than a second preset threshold, determining that the foreground region comprises the dotted-and-solid line.

4. The method of claim 3, wherein the determining distances between solid lines and dotted lines of respective groups of lines comprised in the foreground region, comprises:
selecting a plurality of points in the solid line or the dotted line, for the solid line and the dotted line of a group of lines; and
calculating an average value of distances from a plurality of points in the solid line or the dotted line to the dotted line or the solid line of the corresponding group of lines, and taking the average value as the distance between the solid line and the dotted line.

5. The method of claim 3, further comprising:
determining the dotted-and-solid line comprised in the foreground region, according to the solid line and the dotted line with distance smaller than the second preset threshold;
wherein the determining a lane line detection result according to the solid line, the dotted line, and whether a dotted-and-solid line is comprised in the foreground region, comprises:
determining the lane line detection result according to an attribute of the solid line, an attribute of the dotted line and an attribute of the dotted-and-solid line.

6. The method of claim 1, further comprising:
acquiring a vehicle detection and tracking result; and
judging, according to the vehicle detection and tracking result and the lane line detection result, whether a vehicle violates traffic regulations.

7. An electronic device, comprising:
at least one processor; and
a memory communicatively connected with the at least one processor,
wherein the memory stores instructions executable by the at least one processor, the instructions being executed by the at least one processor to enable the at least one processor to execute operations of:
dividing an image into a foreground region and a background region;
determining a solid line and a dotted line comprised in the foreground region;
determining, according to the solid line and the dotted line comprised in the foreground region, whether a dotted-and-solid line is comprised in the foreground region; and
determining a lane line detection result according to the solid line, the dotted line, and whether a dotted-and-solid line is comprised in the foreground region,
wherein the determining a solid line and a dotted line comprised in the foreground region, comprises:
performing semantic segmentation on the foreground region, to obtain, in the foreground region, a first class of pixels predicted as a solid line and the first features of the first class of pixels, and a second class of pixels predicted as a dotted line and second features of the second class of pixels;
clustering the first features of the first class of pixels, and performing straight line fitting on the first class of pixels clustered into the same class, to obtain the solid line comprised in the foreground region; and
clustering the second features of the second class of pixels, and performing straight line fitting on the second class of pixels clustered into a same class, to obtain the dotted line comprised in the foreground region.

8. The electronic device of claim 7, wherein the determining a solid line and a dotted line comprised in the foreground region, further comprises:
in a case where an area of the foreground region is larger than a first preset threshold, determining the solid line and the dotted line comprised in the foreground region.

9. The electronic device of claim 7, wherein the determining, according to the solid line and the dotted line comprised in the foreground region, whether a dotted-and-solid line is comprised in the foreground region, comprises:
determining distances between solid lines and dotted lines of respective groups of lines comprised in the foreground region, wherein each group of lines comprise a solid line and a dotted line; and
in a case where a distance of the distances is smaller than a second preset threshold, determining that the foreground region comprises the dotted-and-solid line.

10. The electronic device of claim 9, wherein the determining distances between solid lines and dotted lines of respective groups of lines comprised in the foreground region, comprises:
   selecting a plurality of points in the solid line or the dotted line, for the solid line and the dotted line of a group of lines; and
   calculating an average value of distances from a plurality of points in the solid line or the dotted line to the dotted line or the solid line of the corresponding group of lines, and taking the average value as the distance between the solid line and the dotted line.

11. The electronic device of claim 9, wherein the instructions are executable by the at least one processor to enable the at least one processor to further execute operations of:
   determining the dotted-and-solid line comprised in the foreground region, according to the solid line and the dotted line with the distance smaller than the second preset threshold;
   wherein the determining a lane line detection result according to the solid line, the dotted line, and whether a dotted-and-solid line is comprised in the foreground region, comprises:
   determining the lane line detection result according to an attribute of the solid line, an attribute of the dotted line and an attribute of the dotted-and-solid line.

12. The electronic device of claim 7, wherein the instructions are executable by the at least one processor to enable the at least one processor to further execute operations of:
   acquiring a vehicle detection and tracking result; and
   judging, according to the vehicle detection and tracking result and the lane line detection result, whether a vehicle violates traffic regulations.

13. A non-transitory computer-readable storage medium storing computer instructions for enabling a computer to execute operations of:
   dividing an image into a foreground region and a background region;
   determining a solid line and a dotted line comprised in the foreground region;
   determining, according to the solid line and the dotted line comprised in the foreground region, whether a dotted-and-solid line is comprised in the foreground region; and
   determining a lane line detection result according to the solid line, the dotted line, and whether a dotted-and-solid line is comprised in the foreground region,
   wherein the determining a solid line and a dotted line comprised in the foreground region comprises:
   performing semantic segmentation on the foreground region to obtain, in the foreground region, a first class of pixels predicted as a solid line, and first features of the first class of pixels, and a second class of pixels predicted as a dotted line and second features of the second class of pixels,
   clustering the first features of the first class of pixels, and performing straight line fitting on the first class of pixels clustered into a same class, to obtain the solid line comprised in the foreground region; and
   clustering the second features of the second class of pixels, and performing straight line fitting on the second class of pixels clustered into a same class, to obtain the dotted line comprised in the foreground region.

14. The non-transitory computer-readable storage medium of claim 13, wherein the determining a solid line and a dotted line comprised in the foreground region, further comprises:
   in a case where an area of the foreground region is larger than a first preset threshold, determining the solid line and the dotted line comprised in the foreground region.

15. The non-transitory computer-readable storage medium of claim 13, wherein the determining, according to the solid line and the dotted line comprised in the foreground region, whether a dotted-and-solid line is comprised in the foreground region, comprises:
   determining distances between solid lines and dotted lines of respective groups of lines comprised in the foreground region, wherein each group of lines comprise a solid line and a dotted line; and
   in a case where a distance of the distances is smaller than a second preset threshold, determining that the foreground region comprises the dotted-and-solid line.

16. The non-transitory computer-readable storage medium of claim 15, wherein the determining distances between solid lines and dotted lines of respective groups of lines comprised in the foreground region, comprises:
   selecting a plurality of points in the solid line or the dotted line, for the solid line and the dotted line of a group of lines; and
   calculating an average value of distances from a plurality of points in the solid line or the dotted line to the dotted line or the solid line of the corresponding group of lines, and taking the average value as the distance between the solid line and the dotted line.

17. The non-transitory computer-readable storage medium of claim 15, wherein the computer instructions are executable by the computer to enable the computer to further execute operations of:
   determining the dotted-and-solid line comprised in the foreground region, according to the solid line and the dotted line with distance smaller than the second preset threshold;
   wherein the determining a lane line detection result according to the solid line, the dotted line, and whether a dotted-and-solid line is comprised in the foreground region, comprises:
   determining the lane line detection result according to an attribute of the solid line, an attribute of the dotted line and an attribute of the dotted-and-solid line.

* * * * *